United States Patent
Loeffler et al.

(10) Patent No.: US 6,377,884 B1
(45) Date of Patent: Apr. 23, 2002

(54) METHOD AND DEVICE FOR CONTROLLING THE DRIVE TRAIN OF A VEHICLE

(75) Inventors: Juergen Loeffler, Winnenden; Holger Huelser, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/623,051

(22) PCT Filed: Sep. 8, 1999

(86) PCT No.: PCT/DE99/02829

§ 371 Date: Jan. 16, 2001

§ 102(e) Date: Jan. 16, 2001

(87) PCT Pub. No.: WO00/38943

PCT Pub. Date: Jul. 6, 2000

(30) Foreign Application Priority Data

Dec. 29, 1998 (DE) .......................... 198 60 645

(51) Int. Cl.[7] .................... G06F 17/00; G06F 19/00
(52) U.S. Cl. .................... 701/54; 701/84; 701/121; 318/434
(58) Field of Search ................ 701/54, 69, 81, 701/84, 89, 121; 318/433, 434; 340/439, 441

(56) References Cited

U.S. PATENT DOCUMENTS

| | | | |
|---|---|---|---|
| 5,442,268 A | * | 8/1995 | Goodarzi et al. ........... 318/432 |
| 5,952,799 A | * | 9/1999 | Maisch et al. ............. 303/20 |
| 5,957,551 A | * | 9/1999 | Maron et al. .............. 303/20 |
| 5,961,190 A | * | 10/1999 | Brandmeier et al. ......... 303/20 |

FOREIGN PATENT DOCUMENTS

| | | |
|---|---|---|
| DE | 196 19 324 | 4/1997 |
| DE | 196 11 502 | 9/1997 |
| DE | 196 44 881 | 4/1998 |
| EP | 0 557 299 | 8/1994 |
| EP | 0 406 615 | 8/1995 |

* cited by examiner

Primary Examiner—Gertrude Arthur
(74) Attorney, Agent, or Firm—Kenyon & Kenyon

(57) ABSTRACT

A method and a device are described for controlling a drive train of a vehicle having a gas pedal activated by a driver of the vehicle. A setpoint value is formed for a drive torque or a setpoint value for a drive power as a function of the position of a gas pedal. The drive train is then controlled in a such a way that the drive torque or the drive power is set as a function of the setpoint value formed. An interval with pre-definable interval limits is determined. The interval limits represent maximum and minimum values for the drive torque or the drive power to be set. The setpoint values are formed as a function of the determined interval. The basis for an optimal adaptation of the drive torque or the drive power to be set to the driver's preference and to the prevailing driving condition is made possible.

10 Claims, 6 Drawing Sheets

METHOD AND DEVICE FOR CONTROLLING THE DRIVE TRAIN OF A VEHICLE

This application is a 371 of PCT/DE99/02829 filed Sep. 8, 1999.

FIELD OF THE INVENTION

The present invention relates to a method and a device for controlling the drive train of a vehicle.

BACKGROUND INFORMATION

In motor vehicles having drive train management, the drive torque and the drive power can be set by electronic control of the engine and transmission. In order to provide the drive torque desired by the driver and the corresponding drive power, an output torque from the engine and a set speed ratio from the transmission is required. It is essential in this context to make an appropriate determination of this desired torque and the desired power.

German Patent Application No. 196 93 324 A shows an engine control system in which a relative engine output torque is provided via a characteristic map as a function of the engine r.p.m. and the position of the gas pedal activated by the driver of the vehicle. Considering the possible torque interval of the engine at the current operating point, a setpoint value is determined for the engine torque. This method is related only to engine power control, however, not to drive train control, in which all the components forming the drive train, such as engine, clutch, torque converter, and transmission, are considered.

European Patent No. 0 557 299 describes a method in which an absolute value for the drive torque is formed from a characteristic map as a function of the gas pedal position and the vehicle speed.

European Patent No. 0 406 615 describes that the driving activity and the driving type of the driver can be inferred, among other things, from the activation of the gas pedal.

SUMMARY OF THE INVENTION

An object of the present invention is to optimally adapt the drive torque to be set or the drive power to be set to the driver's preference and to the prevailing driving condition during drive train control.

The present invention is based on a method and a device for controlling the drive train of a vehicle having a gas pedal activated by the driver of the vehicle. In this context a setpoint value is formed for the drive torque or a setpoint value for the drive power as a function of the position of the gas pedal. Then the drive train is controlled in a such a way that the drive torque or the drive power is set as a function of the setpoint value formed. The core of the invention determines an interval with pre-definable interval limits. The interval limits represent maximum and minimum values for the drive torque to be set or the drive power to be set. The setpoint values are formed as a function of the determined interval according to the present invention. The basis for optimal adaptation of the drive torque to be set or the drive power to be set to the driver's preference and to the prevailing driving condition is made possible by the drive train control according to the present invention.

In an advantageous embodiment of the present invention, the lower interval limit is determined as a function of: the minimum power or minimum torque that can be currently generated by the vehicle engine the instantaneous torque ratio of the transmission, the operating condition of a transformer in the drive train and/or the operating condition of a clutch in the drive train, in particular a transformer bridging clutch.

The upper interval limit can be determined as a function of: the maximum power or maximum torque that can currently be generated by the vehicle engine and/or the prevailing efficiency of the components forming the drive train.

It is particularly advantageous to measure a speed quantity representing the longitudinal vehicular speed and to determine the upper interval limit and/or the lower interval limit as a function of the measured speed quantity.

Furthermore, in an advantageous embodiment of the present invention, a driver type quantity is determined representing the driving behavior of the driver. The setpoint value for the drive torque or the setpoint value for the drive power is then formed as a function of the determined driver type quantity.

The position of the gas pedal can be compared with a pre-definable lower threshold value and/or a pre-definable upper threshold value. With this embodiment of the present invention, the setpoint value for the drive torque or the setpoint value for the drive power is formed as a function of this comparison. In this context a speed quantity is measured representing the longitudinal vehicular speed and at least one threshold value is pre-determined as a function of the measured speed quantity.

Furthermore, in the previously described embodiment, a negative setpoint value (coastdown operation) can be set when the position of the gas pedal drops below the lower threshold value. When the position of the gas pedal is within the threshold value, then a setpoint value within the interval limits is set (normal operation). When the position of the gas pedal exceeds the upper threshold value, then a setpoint value is set that exceeds the upper interval limits (kickdown operation).

DETAILED DESCRIPTION

Figure 1:
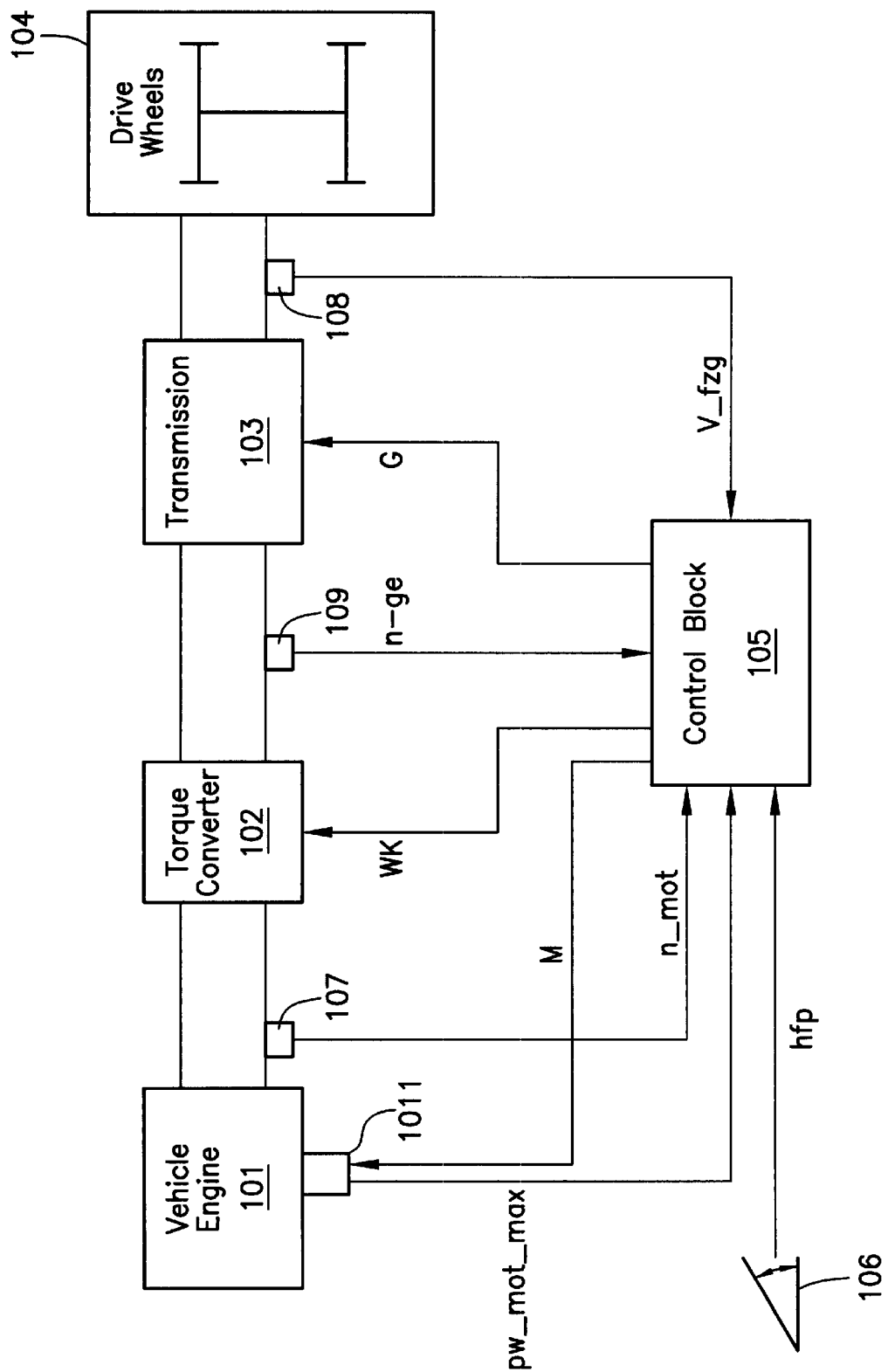
FIG. 1 shows a drive train of a motor vehicle.

FIG. 1 shows the drive train of a motor vehicle having vehicle engine 101, torque converter 102, which may be bridged by a transformer bridging clutch, transmission 103, which can be laid out as adjustable either stepwise or continuously, and block 104 representing the drive wheels (optionally having a differential transmission not illustrated).

Engine r.p.m. n__mot, the transmission output r.p.m. n__ga or longitudinal vehicular speed v__fzg related in a simple manner to the transmission output r.p.m. n__ga, and transmission input r.p.m. n_ge are measured using r.p.m. sensors 107, 108, and 109 and are supplied to control block 105. Furthermore, relative gas pedal position hfp of gas pedal 106 activated by the driver of the vehicle is measured and supplied to control block 105. Maximum attainable (under present conditions) absolute peak power pw_mot_max of engine 101 is supplied from engine control unit 1011 to control block 105.

For controlling the components of the drive train, control block 105 regulates engine control unit 1011 using signal M, the bridging clutch of torque converter 102 using signal WK and the transmission using signal G. A setpoint engine torque or a setpoint engine power, for example, is given by signal M. The transformer bridging clutch, for example, is opened or closed with signal WK and the transmission reduction ratio is controlled with signal G.

According to the present invention, a setpoint transmission output torque md_ga_faw is determined from the relative gas pedal position hfp, the vehicle speed v_fzg, a suitably defined possible power interval I on the transmission output, and the driver type ftyp. Setpoint transmission output torque md_ga_faw is representative of the desired drive torque, since both quantities are in a fixed relationship to each other in the case of constant differential reduction ratio.

As mentioned, the quantity v_fzg gives the vehicle speed, v_fzg being $\geq 0$ km/h. The relative gas pedal position hfp is in the interval [0,100], the driver type ftyp in the interval [0,1]. In this context, the value 0 stands for a very economy-oriented driver and the value 1 for a maximum-performance oriented driver.

The total computational algorithm is illustrated by the following points with all its embodiments according to the present invention:

a) The definition of a possible power interval I=[pw_min, pw_tot] at the transmission output which serves as a basis for the calculation of the driver's desired torque.

b) A boundary of this possible output interval I as a function of vehicle speed.

c) A gas pedal characteristic in normal operation as a function of the driver type.

d) Adjusting the zero point of the gas pedal as a function of the speed.

e) Special treatment for kickdown-operation.

Figure 2:
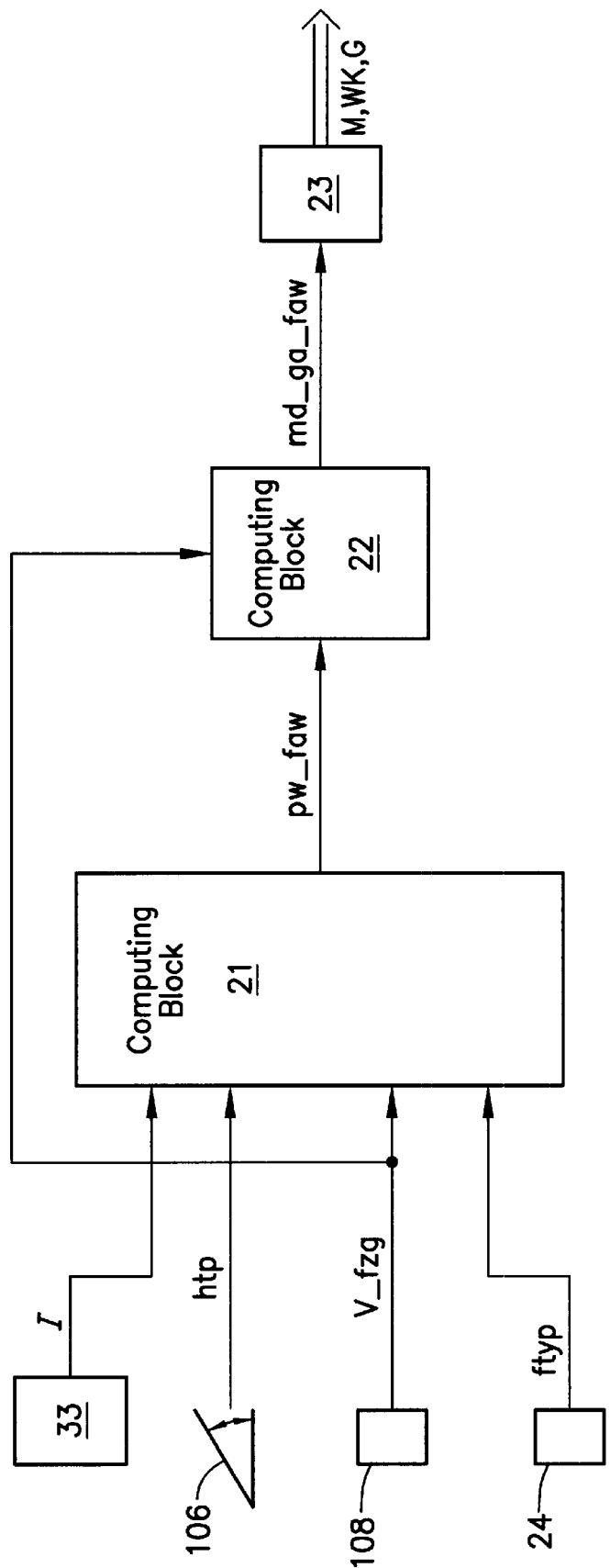
FIG. 2 shows a block diagram of a circuit according to the present invention.

The principle of the sequence is clarified by FIG. 2.

Initially, the setpoint transmission output power value pw_faw output is determined computing block 21 from the quantities hfp (gas pedal position), interval I=[pw_min, pw_tot] (of block 33 yet to be described/FIG. 3), v_fzg (longitudinal vehicular speed) and ftyp (driver type).

The quantity representing the driver type ftyp is determined in block 24 in a conventional manner from the activation of gas pedal 106, in particular from the change of the gas pedal position hfp over time and optionally from further quantities such as the longitudinal vehicular speed v_fzg and/or the vehicular transverse acceleration. In addition, reference is made to European Pat. No. 0 406 615 described above.

In a further step, the setpoint transmission output torque md_ga_faw is derived at the transmission output in computing block 22 from the setpoint transmission output power pw_faw formed in block 21 of FIG. 2. For this calculation the transmission output r.p.m. n_ga is needed. The described signals M, WK, and G are formed as a function of the setpoint transmission output torque md_ga faw in block 23 for regulating the components of the drive train so that the desired setpoint transmission output torque md_ga_faw is set. Of course, in block 23 the desired transmission output torque md_ga_faw can be modified; for example it can be adapted to the prevailing driving condition.

The operating modes normal, coastdown and kickdown are distinguished in computing block 21. The operating modes are derived from gas pedal position hfp, a zero point for the gas pedal hfp_np and a kickdown point for the gas pedal hfp_kd taken into consideration. The modes can thereby be established as follows:

| Normal operation: | hfp_np $\leq$ hfp $\leq$ hfp_kd |
| Drag operation: | hfp < hfp_np |
| Kickdown operation: | hfp > hfp_kd |

In particular, the calculations in computing block 21 are performed as follows.

a): Calculation of Power Interval (FIG. 3)

Figure 3:
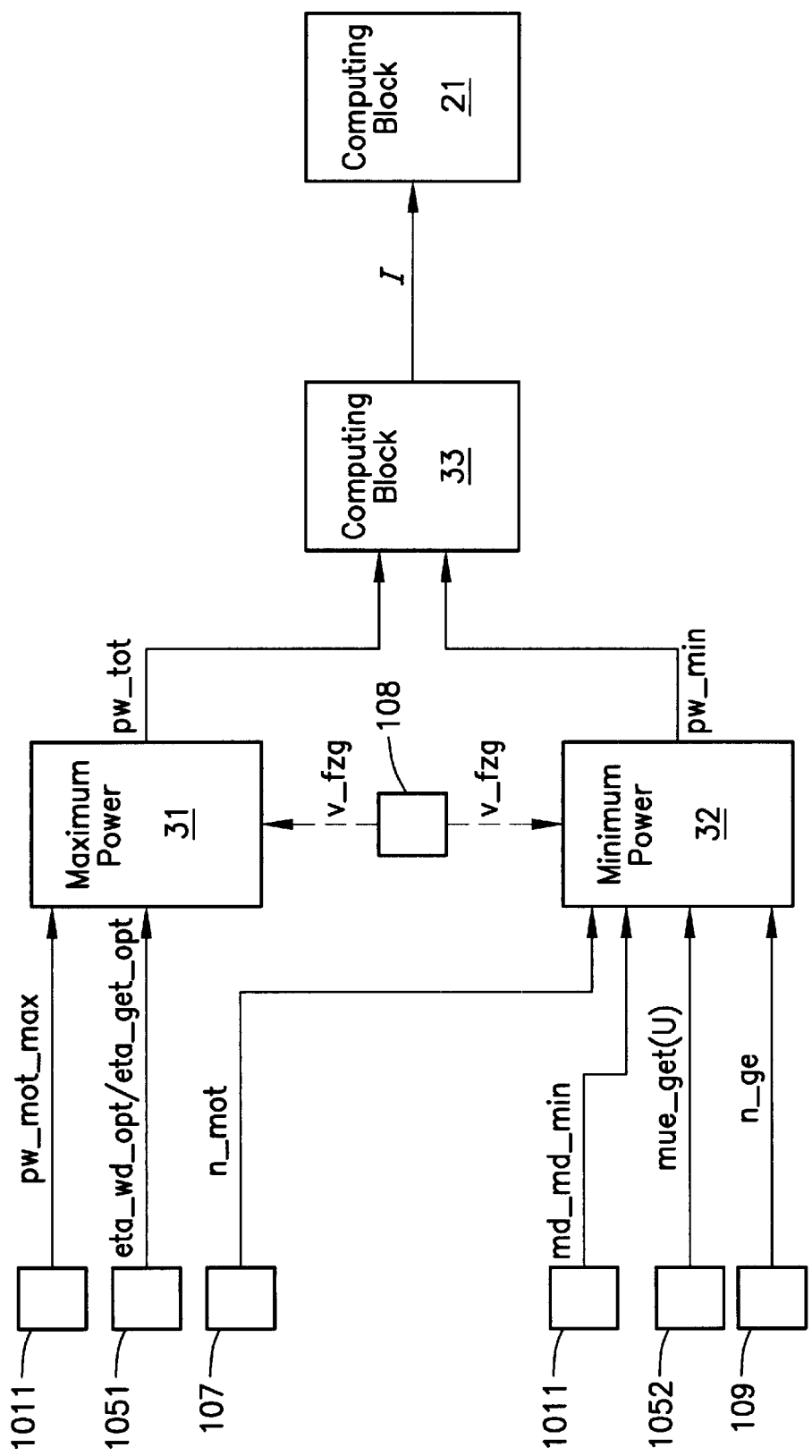
FIG. 3 shows a block diagram of a circuit according to the present invention that calculates a power interval.

The maximum attainable power at the transmission output pw_tot is determined in block 31 of FIG. 3 from the product of the absolute peak power pw_mot_max of the engine and the optimal efficiencies eta_get_opt and eta_wd_opt of transmission 103 and torque converter 102.

$$pw\_tot = pw\_mot\_max * eta\_get\_opt * eta\_wd\_opt$$

The peak power of the engine is supplied in this embodiment by engine controller 1011, while the efficiencies eta_get_opt and eta_wd_opt are present, in general in drive train controller 105 as characteristic maps (block 1051). The input and/or output r.p.m. of the transformer and the transmission are supplied in general to the characteristic maps for determining the efficiency.

The quantity pw_mot_max depends on the engine temperature, the fuel quality and the environmental conditions, for example the air pressure:

$$pw\_mot\_max = f(\text{engine temperature, fuel quality, environmental conditions}).$$

The minimum power attainable at the transmission output pw_min during coastdown is calculated in block 32 for the instantaneous engine r.p.m. n_mot and the instantaneous r.p.m. ratio of transmission u. It is determined as:

| pw_min = | md_ma_min(n_mot) * mue_get(u) * mue_wd_schub(n_ge, n_mot, transformer condition) |
| with | |
| md_ma_min: | minimum possible engine torque (from engine controller 1011), as a function of the engine r.p.m. n_mot. |
| n_mot: | instantaneous engine r.p.m. (from sensor 107). |
| mue_get(u): | torque ratio of the transmission in the prevailing r.p.m. ratio u (block 1051, generally in control block 105). |
| mue_wd_schub: | torque amplification of the transformer during coastdown as a function of the current transmission input r.p.m. n_ge, engine r.p.m. n_mot and the transformer condition (e.g., transformer clutch open/closed, evaluation of control signal WK). |

The interval limits pw_tot and pw_min of interval I are supplied via block 33 to previously described unit 21 (FIG. 2).

b): Limits of power interval I as a function of speed

The vehicle speed v_fzg is supplied to blocks 31 and 32 in FIG. 3 by sensor 108 in this embodiment of the present invention. A highly sensitive input of the driver's desired torque can be attained even at low speeds by limiting the output required at kickdown point hfp_kd as a function of vehicular speed v_fzg. At the kickdown point hfp_kd, the required transmission output power pw_max is:

$$pw\_max = f1(v\_fzg) * pw\_tot$$

Function f1 can be represented by a pre-definable characteristic curve. The limit as a function of speed has the following background:

At low speeds the maximum absolute attainable transmission output power pw_tot cannot be made available due to the dependence of the engine r.p.m. on the maximum engine output torque at the transmission output. It is therefore advantageous to limit the power required by the gas pedal at the kickdown point in this operation range to the maximum attainable power in each case at the prevailing speed.

It is furthermore advantageous to limit the coastdown torque required in the gas pedal position hfp=0 as a function of speed. The required power, transmission output power at hfp=0, is then $$pw\_inf = f2(v\_fzg) * pw\_min.$$

Function f2 can be represented by a pre-definable characteristic curve.

Figure 6:
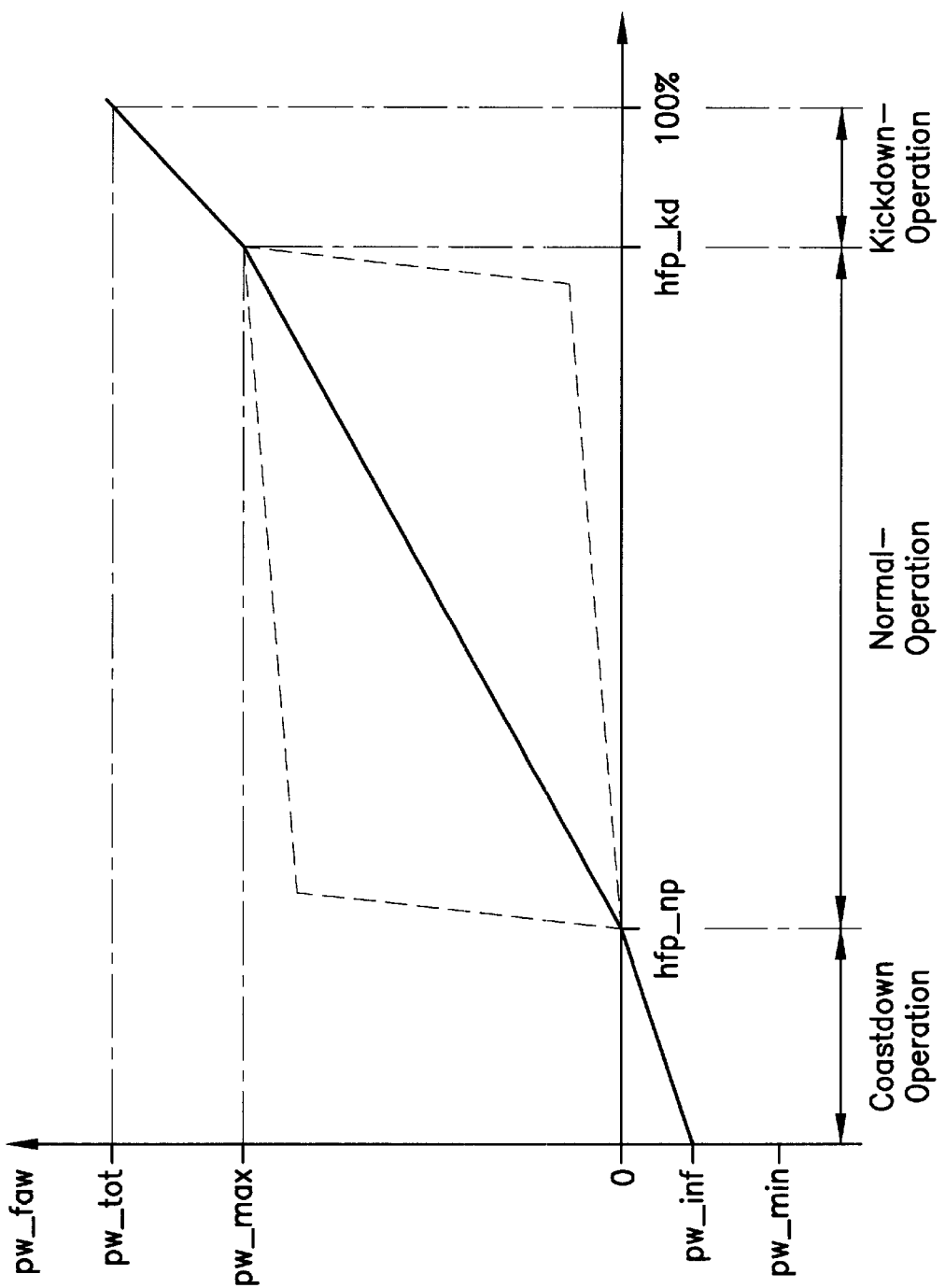
FIG. 6 shows a characteristic curve of an embodiment of the present invention via an assignment of gas pedal positions to drive power values.

In coastdown operation power is required by gas pedal 106 in the interval [pw_inf, 0]. In normal operation the interval [0, pw_max] and in kickdown operation the interval [pw_max, pw_tot] are covered. The operating modes and their assignment to the power intervals are represented in FIG. 6 as simplified sketches.

In coastdown operation the required power, setpoint transmission output power pw_faw, is determined according to the equation $$pw\_faw = 1 - \frac{hfp}{hfp\_np} * pw\_inf$$

In kickdown operation the quantity pw_faw is calculated according to the rule $$pw\_faw = \frac{hfp - hfp\_kd}{100\ [\%] - hfp\_kd} * (pw\_tot - pw\_max) + pw\_max$$

In normal operation a driver type-dependent gas pedal characteristic as a function of driver type is used. The non-linear assignment of the interval [hfp_np, hfp_kd] to the power interval [0, pw_max] is indicated in FIG. 6 by an area bordered by dashed lines.

Concerning c): Calculation of desired power in normal operation

To calculate quantity pw faw in normal operation, the relative gas pedal position (fp_rel) relative to the interval (hfp_np, hfp_kd) is determined:

$$fp\_rel = \frac{hfp - hfp\_np}{hfp\_kd - hfp\_np}$$

Figure 4:
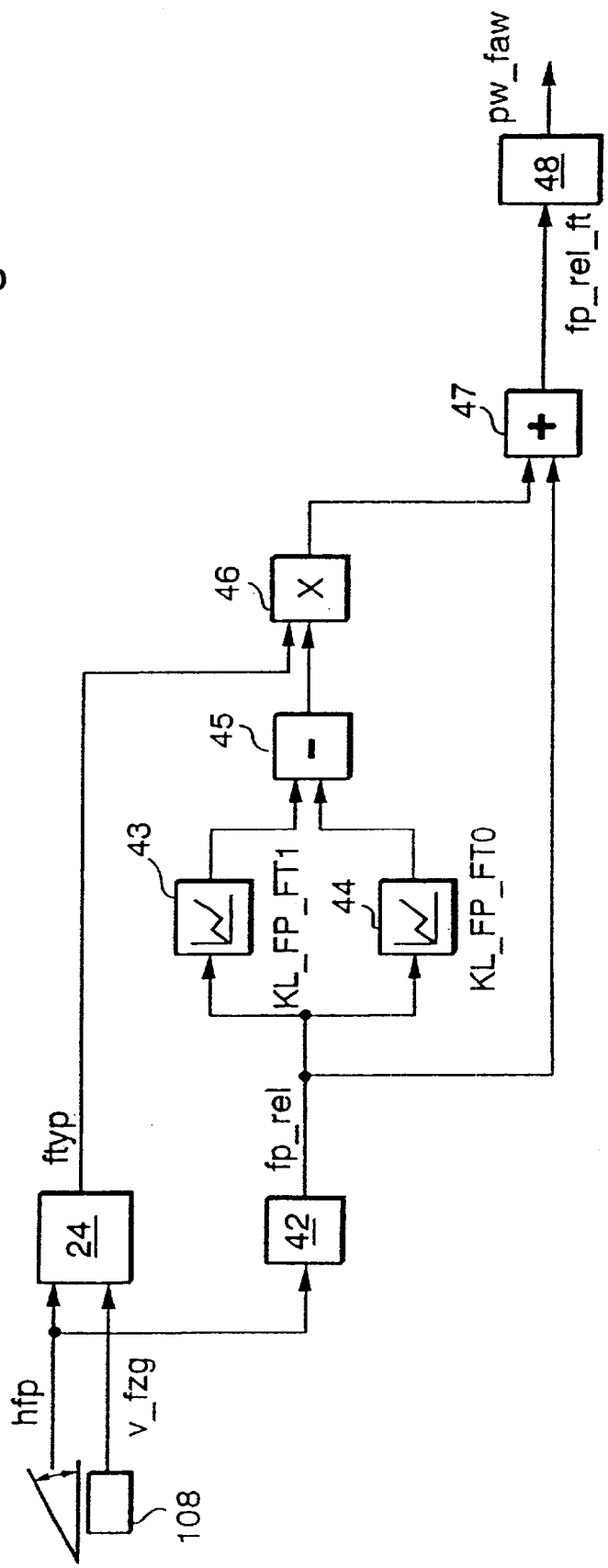
FIG. 4 shows a block diagram of a circuit according to the present invention that determines a setpoint output transmission power.

This happens in block 42 of FIG. 4.

The quantity fp_rel is within interval [0,1]. This interval is mapped considering the driver type in an interval with the same limits:

$$[0, 1] \xrightarrow{\text{Mapping g}} [0, 1].$$

The result of this illustration is a quantity fp_rel_ft. Mapping g is described in FIG. 4 by a data flow-chart.

Driver type ftyp is determined via previously described block 24. The influence as a function of driver type is considered by characteristic curves KL_FP_FTO 43 for a very economy-oriented driver and KL_FP_FT1 42 for a maximum-performance oriented driver. An interpolation (blocks 45, 46, and 47) is made according to driver type ftyp between the values selected from these characteristic curves.

The characteristic curves KL_FP_FTO and KL_FP_FT1 can be expanded in a variant of the method by additionally considering the vehicular speed in the characteristic maps.

The power required in normal operation, setpoint transmission output power according to driver preference, is calculated in block 48 as $$pw\_faw = fp\_rel\_ft * pw\_max.$$

d): Calculation of the Zero Point

In block 501 of FIG. 5 the assignment already described of the gas pedal position to the operating modes normal, coastdown and kickdown occurs as follows:

| Normal operation: | hfp_np ≤ hfp ≤ hfp_kd |
|---|---|
| Coastdown operation: | hfp < hfp_np |
| Kickdown operation: | hfp > hfp_kd |

The size of the area for coastdown operation can be varied by adjusting the zero point for the gas pedal hfp_np as a function of vehicle speed. For this purpose, vehicle speed v_fzg is supplied to block 501.

At high vehicle speeds a large value for zero point for the gas pedal hfp_np is recommended; at low vehicular speeds this can become zero. In this case coastdown operation no longer occurs even at hfp=0, so that, for example, the vehicle can start moving without coastdown torque before at traffic light. The determination of zero point for the gas pedal hfp_np is performed by a characteristic map with input quantity v_fzg.

e): Calculation of Kickdown Point

Figure 5:
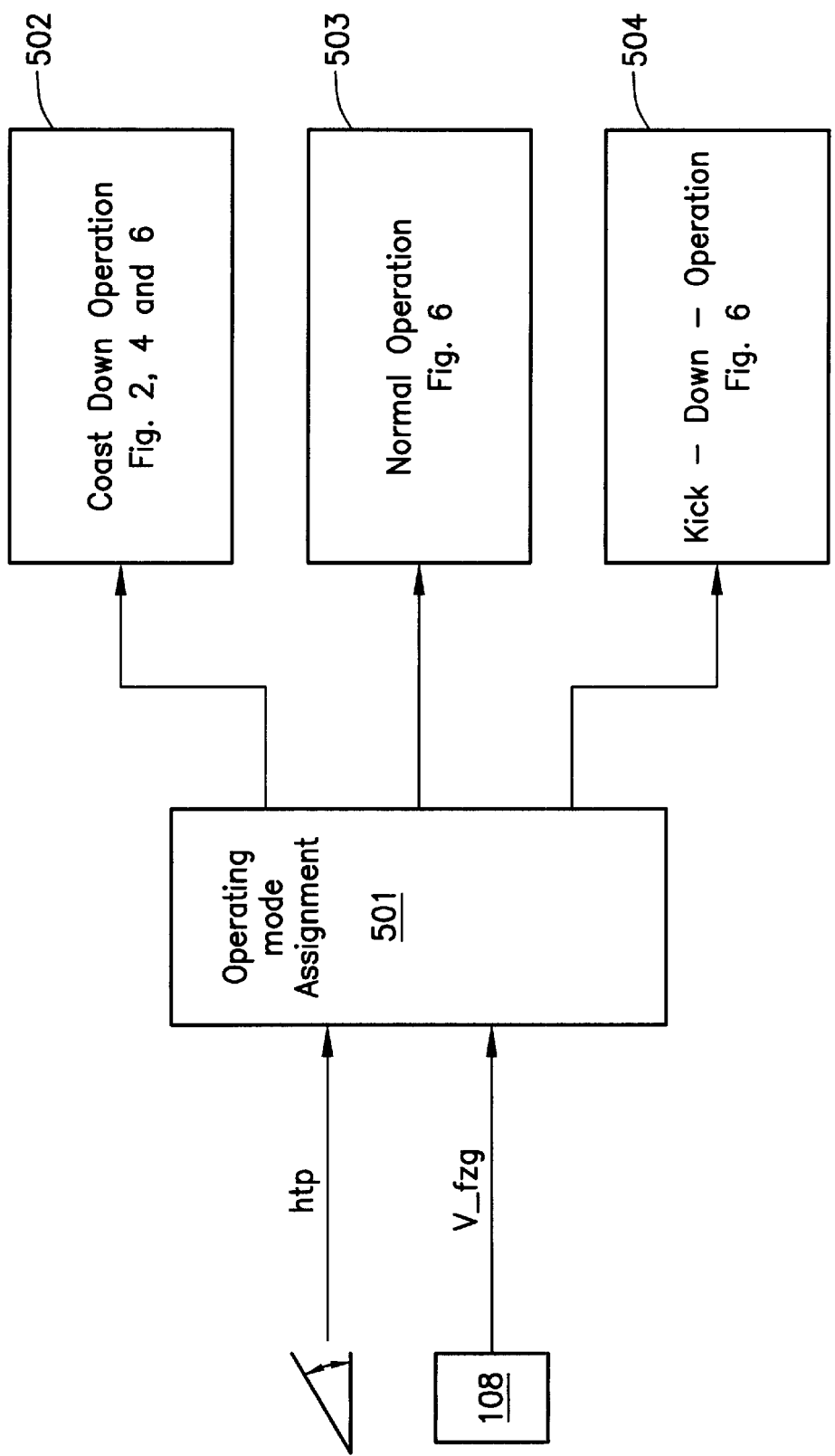
FIG. 5 shows a block diagram of a circuit according to the present invention that determines a kickdown setpoint.

In block 501 of FIG. 5 the size of the area for kickdown operation can be varied by an adjustment as a function of the vehicle speed of kickdown point hfp_kd. The determination of kickdown point hfp_kd is performed by a characteristic map with input quantity v_fzg.

Setpoint transmission output power pw_faw calculated considering points a) to e) in computing block 21 of FIG. 2 is converted in computing block 22 to a setpoint transmission output torque md_ga_faw:

$$md\_ga\_faw = \frac{pw\_faw}{2 * \pi * n\_ga\_strich}.$$

n_ga_strich is the transmission output r.p.m. n_ga limited in its value by a lower limit.

Overview of variable names used:

| | |
|---|---|
| fp_rel | relative gas pedal position, relative to the interval [hfp_np, hfp_kd) |
| ftyp | driver type |
| hfp | relative gas pedal position |
| hfp_kd | kickdown point for gas pedal |
| hfp_np | zero point for gas pedal |
| md_ga_faw | setpoint transmission output torque according to driver preference |
| n_ga | transmission output r.p.m. |
| pw_faw | setpoint transmission output power according to driver preference |
| pw_ga | transmission output power |
| pw_inf | required transmission output power at hfp = 0 |
| pw_max | required transmission output power at kickdown point |
| pw_min | minimum attainable power in transmission output |
| pw_tot | maximum absolute attainable power at transmission output |
| u | r.p.m. ratio of transmission |
| u_max | maximum r.p.m. ratio of transmission |
| v_fzg | vehicle speed |

What is claimed is:

1. A method for controlling a drive train of a vehicle having a gas pedal activated by a driver of the vehicle, the method comprising the steps of:

determining an interval having pre-definable interval limits, the pre-definable interval limits including a lower interval limit and an upper interval limit, the pre-definable interval limits representing a minimum value and a maximum value of one of a drive torque and a drive power;

forming one of a first setpoint value for the drive torque and a second setpoint value for the drive power as a function of a position of the gas pedal and the interval; and setting one of the drive torque and the drive power as a function of the one of the first setpoint value and the second setpoint value.

2. The method according to claim 1, further comprising at least one of the steps of:

determining the lower interval limit as a function of at least one of:
a minimum power that can be generated at a moment by an engine,
a minimum torque that can be generated at the moment by the engine,
a prevailing torque ratio of a transmission;
an operating condition of a transformer in the drive train, and
an operating condition of a clutch in the drive train; and determining the upper interval limit as a function of at least one of:
one of a maximum power and a maximum torque that can be generated at the moment by the engine, and
a prevailing efficiency of components forming the drive train.

3. The method according to claim 1, further comprising the steps of:

measuring a speed quantity representing a longitudinal vehicular speed; and determining at least one of the upper interval limit and the lower interval limit as a function of the measured speed quantity.

4. The method according to claim 1, further comprising the steps of:

determining a driver type quantity representing driving behavior of the driver; and forming one of the first setpoint value and the second setpoint value as a function of the driver type quantity.

5. The method according to claim 1, further comprising the steps of:

comparing the position of the gas pedal with at least one of a pre-definable lower threshold value and a pre-definable upper threshold value;

forming one of the first setpoint value and the second setpoint value as a function of the comparison; and measuring a speed quantity representing the longitudinal vehicle speed, at least one of the pre-definable lower threshold value and the pre-definable upper threshold value being pre-definable as a function of the measured speed quantity.

6. The method according to claim 5, further comprising at least one of the steps of:

in coastdown operation, setting one of the first setpoint value and the second setpoint value to a negative value when the position of the gas pedal drops below the lower threshold value;

in normal operation, setting one of the first setpoint value and the second setpoint value within the pre-definable interval limits when the position of the gas pedal is within the pre-definable lower threshold value and the pre-definable upper threshold value; and in kickdown operation, setting one of the first setpoint value and the second setpoint value to a value greater than the upper interval limit.

7. A device for controlling a drive train of a vehicle having a gas pedal activated by a gas pedal activated by a driver of the vehicle, wherein one of a first setpoint value for a drive torque and a second setpoint value for a drive power is formed as a function of a position of the gas pedal, and wherein one of the drive torque and the drive power is set as a function of one of the first setpoint value and the second setpoint value, the device comprising;

an arrangement for determining an interval having pre-definable interval limits, the pre-definable interval limits including a lower interval limit and a upper interval limit, the pre-definable interval limits representing a minimum value and a maximum value for one of the drive torque and the drive power, wherein one of the first setpoint value and the second setpoint value is formed as further function of the determined interval.

8. The device according to claim 7, wherein at least one of:

the lower interval limit is determined as a function of at least one of:
one of a minimum power and a minimum torque that can be generated at a moment by an engine,
a prevailing torque ratio of a transmission,
an operating condition of a transformer in the drive train, and
an operating condition of a clutch in the drive train; and the upper interval limit is determined as a function of at least one of:
one of a maximum power and a maximum torque that can be generated in the moment by the engine, and
a prevailing efficiency of components forming the drive train.

9. The device according to claim 7, wherein:

a speed quantity representing a longitudinal vehicular speed is measured; and at least one of the lower interval limit and the upper interval limit is determined as a function of the measured speed quantity.

10. The device according to claim 7, wherein:

a driver type quantity representing driving behavior of the driver is determined; and one of the first setpoint value and the second setpoint value is formed as a function of the driver type quantity.

* * * * *

UNITED STATES PATENT AND TRADEMARK OFFICE
CERTIFICATE OF CORRECTION

PATENT NO.    : 6,377,884 B1                                        Page 1 of 1
DATED         : April 23, 2002
INVENTOR(S)   : Juergen Loeffler et al.

It is certified that error appears in the above-identified patent and that said Letters Patent is hereby corrected as shown below:

Column 1,
Line 22, change "A shows" to -- describes --
Line 54, change "The core of the invention" to -- The invention --

Signed and Sealed this

Eleventh Day of November, 2003

JAMES E. ROGAN
*Director of the United States Patent and Trademark Office*